(12) United States Patent
Yaworski et al.

(10) Patent No.: US 9,780,549 B2
(45) Date of Patent: Oct. 3, 2017

(54) COVER ASSEMBLIES AND METHODS FOR COVERING ELECTRICAL CABLES AND CONNECTIONS

(71) Applicants: Tyco Electronics Corporation, Berwyn, PA (US); TYCO ELECTRONICS (SHANGHAI) CO. LTD., Shanghai (CN)

(72) Inventors: Harry Yaworski, Cary, NC (US); Alan Tse, Apex, NC (US); Lizhang Yang, Shanghai (CN)

(73) Assignees: TE CONNECTIVITY CORPORATION, Berwyn, PA (US); TYCO ELECTRONICS (SHANGHAI) CO. LTD., Shanghai (CN)

( * ) Notice: Subject to any disclaimer, the term of this patent is extended or adjusted under 35 U.S.C. 154(b) by 110 days.

(21) Appl. No.: 14/856,850

(22) Filed: Sep. 17, 2015

(65) Prior Publication Data

US 2017/0085075 A1 Mar. 23, 2017

(51) Int. Cl.
*H01B 17/00* (2006.01)
*H02G 15/08* (2006.01)
(Continued)

(52) U.S. Cl.
CPC .............. *H02G 15/08* (2013.01); *H01B 3/28* (2013.01); *H01B 3/46* (2013.01); *H01B 19/00* (2013.01);
(Continued)

(58) Field of Classification Search
CPC ........ H02G 15/08; H02G 15/068; H02G 1/14; H02G 15/1833; H02G 15/013;
(Continued)

(56) References Cited

U.S. PATENT DOCUMENTS 1,526,397 A    2/1925   Thornton
3,717,717 A *   2/1973   Cunningham ....... H02G 15/103
                                                                     174/73.1
(Continued)

FOREIGN PATENT DOCUMENTS

EP          0424090 A2    4/1991
EP          0683557 A1    11/1995
(Continued)

OTHER PUBLICATIONS

Cheenne-Astorino et al., "Cold Shrinkable Technology for Medium Voltage Cable Accessory", Proceedings of 1996 Transmission and Distribution Conference and Exposition, Sep. 15-20, 1998, pp. 384-390.

(Continued)

*Primary Examiner* — Angel R Estrada
(74) *Attorney, Agent, or Firm* — Myers Bigel, P.A.

(57) ABSTRACT

A pre-expanded cover assembly for protecting a cable splice connection including a cable, the cable including an electrical conductor surrounded by a cable insulation layer, includes a splice body assembly and a removable holdout. The splice body assembly includes a tubular, cold-shrinkable, electrically insulative, elastomeric splice body having an interior surface defining an interior passage. The splice body assembly further includes a tubular layer of a conformable medium pre-mounted on the interior surface of the splice body. The conformable medium is a flowable material having a high electrical permittivity. The splice body assembly is mounted on the holdout such that the holdout maintains the splice body in an elastically radially expanded state, and the holdout is selectively removable from the splice body to permit the splice body to elastically radially contract. The layer of the conformable medium is positioned and configured such that, when the pre-expanded cover assembly is positioned adjacent the cable splice connection, the holdout is removed from the splice body, and the splice body elastically radially contracts onto the cable splice (Continued)

connection, the layer of the conformable medium will be radially interposed between and engage each of the interior surface of the splice body and an opposing interface surface of the cable insulation.

21 Claims, 11 Drawing Sheets

(51) Int. Cl.
*H01B 3/28* (2006.01)
*H01B 3/46* (2006.01)
*H02G 15/184* (2006.01)
*H01B 19/00* (2006.01)
*H02G 15/18* (2006.01)
*H02G 15/013* (2006.01)
*H02G 15/188* (2006.01)

(52) U.S. Cl.
CPC ......... *H02G 15/013* (2013.01); *H02G 15/184* (2013.01); *H02G 15/188* (2013.01); *H02G 15/1833* (2013.01)

(58) Field of Classification Search
CPC ................ H02G 15/184; H02G 15/188; Y10T 29/49194; Y10T 29/49195; Y10T 29/49174; H01R 4/72; H01B 3/28; H01B 3/46; H01B 19/00
USPC ...... 174/74 R, 88 R, 93 A, 68.1, 68.3, 72 A, 174/176; 29/857, 868, 869; 439/578
See application file for complete search history.

(56) References Cited

U.S. PATENT DOCUMENTS

| | | | |
|---|---|---|---|
| 4,383,131 A | 5/1983 | Clabburn | |
| 4,963,698 A | 10/1990 | Chang et al. | |
| 5,735,981 A | 4/1998 | Winfield et al. | |
| 5,753,861 A | 5/1998 | Hansen et al. | |
| 5,821,459 A | 10/1998 | Cheenne-Astorino et al. | |
| 5,844,170 A | 12/1998 | Chor et al. | |
| 6,245,999 B1 | 6/2001 | Costigan et al. | |
| 6,472,600 B1 * | 10/2002 | Osmani ............. | H02G 15/1826 174/75 R |
| 6,762,364 B2 | 7/2004 | Hofmann et al. | |
| 7,304,242 B1 | 12/2007 | Dower et al. | |
| 7,728,227 B2 * | 6/2010 | Portas ................. | H02G 15/1826 174/73.1 |
| 7,838,770 B2 * | 11/2010 | Portas ................. | H02G 15/1826 174/84 R |
| 7,858,883 B2 | 12/2010 | Seraj et al. | |
| 7,863,521 B2 | 1/2011 | Campbell et al. | |
| 7,901,243 B1 | 3/2011 | Yaworski | |
| 9,178,289 B2 * | 11/2015 | Seraj ................. | H02G 15/1826 |
| 9,202,612 B2 * | 12/2015 | Hernandez ......... | H02G 15/1826 |
| 2014/0262500 A1 | 9/2014 | Yaworski | |

FOREIGN PATENT DOCUMENTS

| | | |
|---|---|---|
| EP | 0780949 A1 | 6/1997 |
| EP | 1206024 A1 | 5/2002 |
| WO | WO 97/32381 A1 | 9/1997 |
| WO | WO 00/01048 A1 | 1/2000 |
| WO | WO 2013/153201 A1 | 10/2013 |
| WO | WO 2014/159228 A1 | 10/2014 |

OTHER PUBLICATIONS

Notification of Transmittal of the International Search Report and the Written Opinion of the International Searching Authority, or the Declaration, in corresponding PCT Application No. PCT/US2016/050864, dated Dec. 9, 2016 (14 pages).

* cited by examiner

US 9,780,549 B2

COVER ASSEMBLIES AND METHODS FOR COVERING ELECTRICAL CABLES AND CONNECTIONS

FIELD OF THE INVENTION

The present invention relates to electrical cables and connections and, more particularly, to protective covers for electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

SUMMARY OF THE INVENTION

According to embodiments of the invention, a pre-expanded cover assembly for protecting a cable splice connection including a cable, the cable including an electrical conductor surrounded by a cable insulation layer, includes a splice body assembly and a removable holdout. The splice body assembly includes a tubular, cold-shrinkable, electrically insulative, elastomeric splice body having an interior surface defining an interior passage. The splice body assembly further includes a tubular layer of a conformable medium pre-mounted on the interior surface of the splice body. The conformable medium is a flowable material having a high electrical permittivity. The splice body assembly is mounted on the holdout such that the holdout maintains the splice body in an elastically radially expanded state, and the holdout is selectively removable from the splice body to permit the splice body to elastically radially contract. The layer of the conformable medium is positioned and configured such that, when the pre-expanded cover assembly is positioned adjacent the cable splice connection, the holdout is removed from the splice body, and the splice body elastically radially contracts onto the cable splice connection, the layer of the conformable medium will be radially interposed between and engage each of the interior surface of the splice body and an opposing interface surface of the cable insulation.

According to method embodiments of the invention, a method of manufacturing a pre-expanded cover assembly for protecting a cable splice connection including a cable, the cable including an electrical conductor surrounded by a cable insulation layer, includes: mounting a tubular layer of a conformable medium on a removable holdout, wherein the conformable medium is a flowable material having a high electrical permittivity; and thereafter mounting a tubular, cold-shrinkable, electrically insulative, elastomeric splice body on the holdout over the conformable medium such that the holdout maintains the splice body in an elastically radially expanded state and an interior surface of the splice body defines an interior passage and engages the conformable medium. The holdout is selectively removable from the splice body to permit the splice body to elastically radially contract. The layer of the conformable medium is positioned and configured such that, when the pre-expanded cover assembly is positioned adjacent the cable splice connection, the holdout is removed from the splice body, and the splice body elastically radially contracts onto the cable splice connection, the layer of the conformable medium will be radially interposed between and engage each of the interior surface of the splice body and an opposing interface surface of the cable insulation.

According to method embodiments of the invention, a method for protecting a cable splice connection including a cable, the cable including an electrical conductor surrounded by a cable insulation layer, includes providing a pre-expanded cover assembly including a splice body assembly and a removable holdout. The splice body assembly includes a tubular, cold-shrinkable, electrically insulative, elastomeric splice body having an interior surface defining an interior passage. The splice body assembly further includes a tubular layer of a conformable medium pre-mounted on the interior surface of the splice body, wherein the conformable medium is a flowable material having a high electrical permittivity. The splice body assembly is mounted on the holdout such that the holdout maintains the splice body in an elastically radially expanded state, and the holdout is selectively removable from the splice body to permit the splice body to elastically radially contract. The method further includes mounting the splice body assembly on the splice connection, including: positioning the pre-expanded splice body assembly adjacent the cable splice connection; and removing the holdout from the splice body assembly to permit the splice body to elastically radially contract onto the cable splice connection such that the layer of the conformable medium is radially interposed between and engages each of the interior surface of the splice body and an opposing interface surface of the cable insulation layer.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

Figure 1:
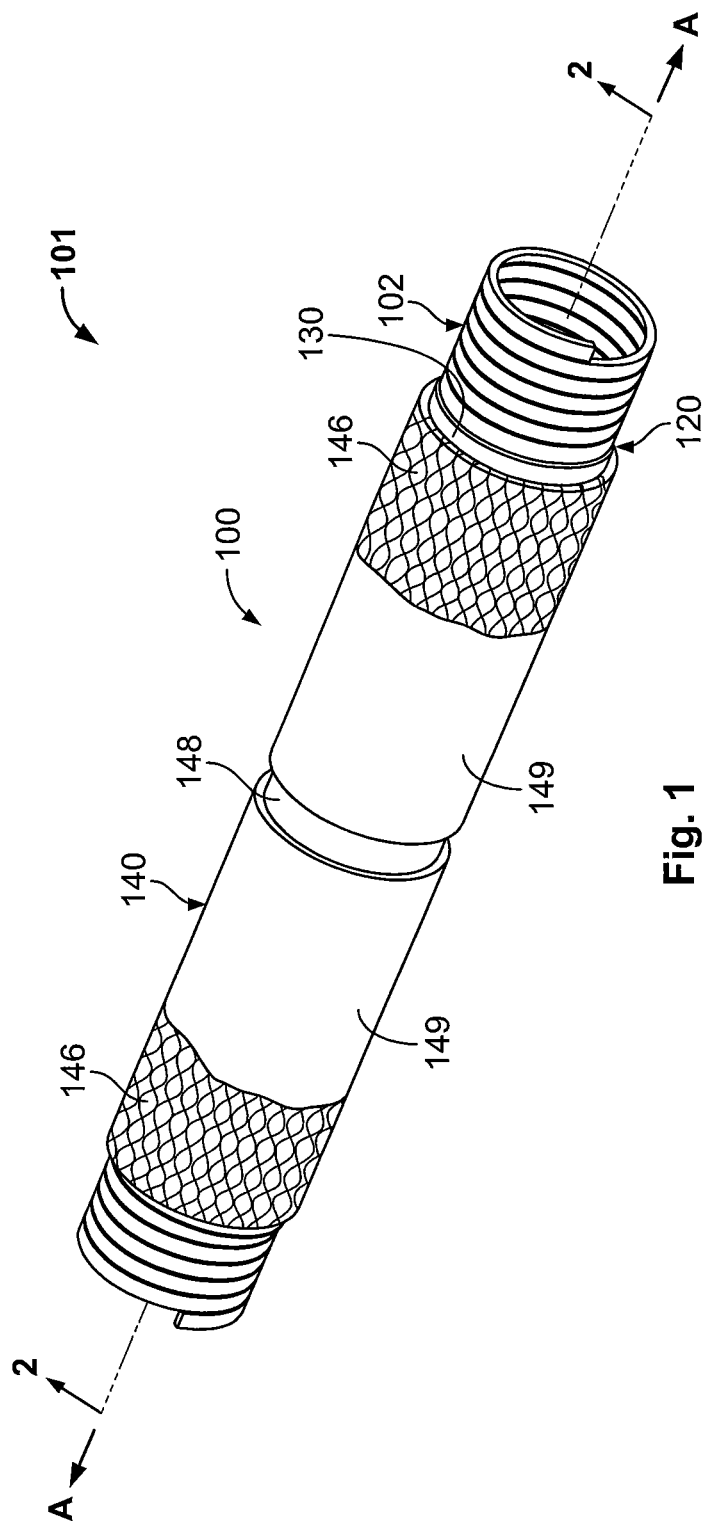
FIG. 1 is a perspective view of a pre-expanded cover assembly unit according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

Figure 2:
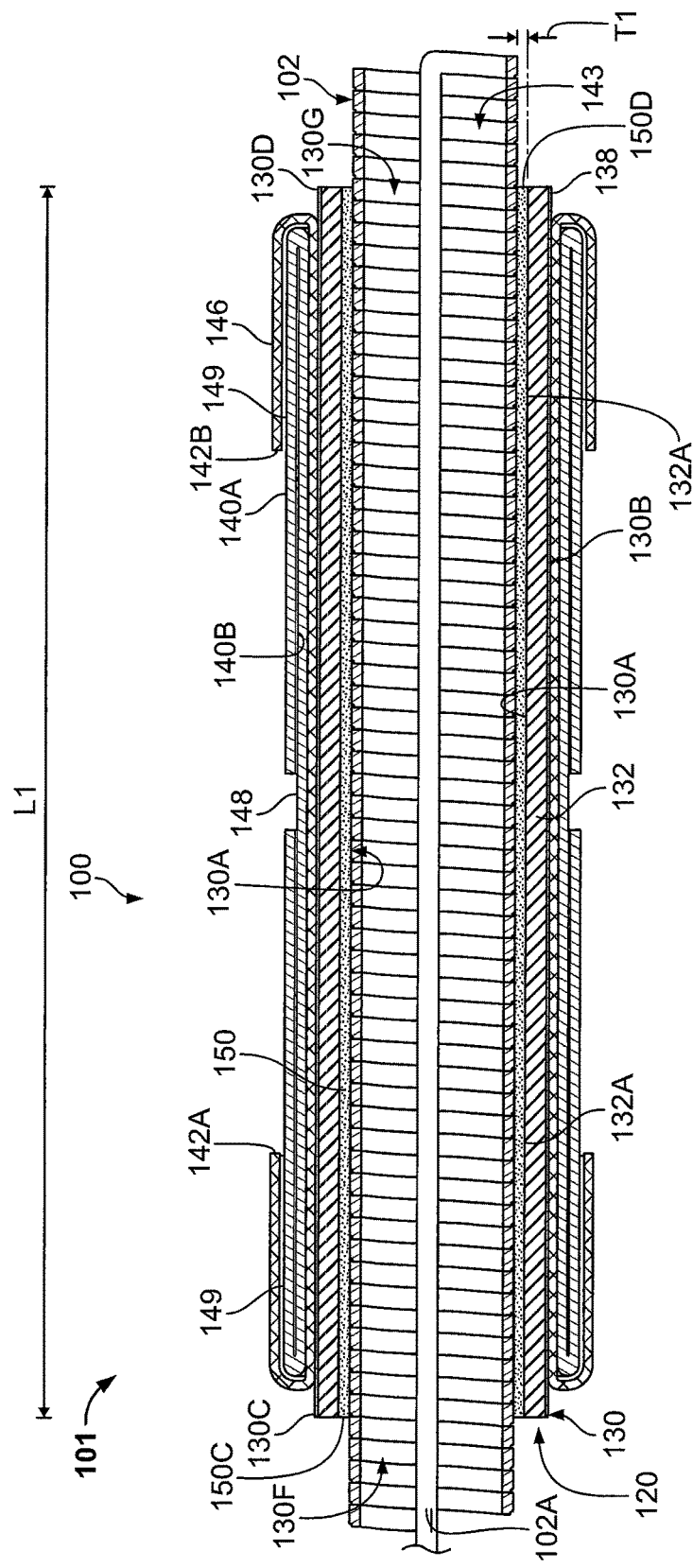
FIG. 2 is a cross-sectional view of the pre-expanded cover assembly unit of FIG. 1 taken along the line 2-2 of FIG. 1.
Figure 3:
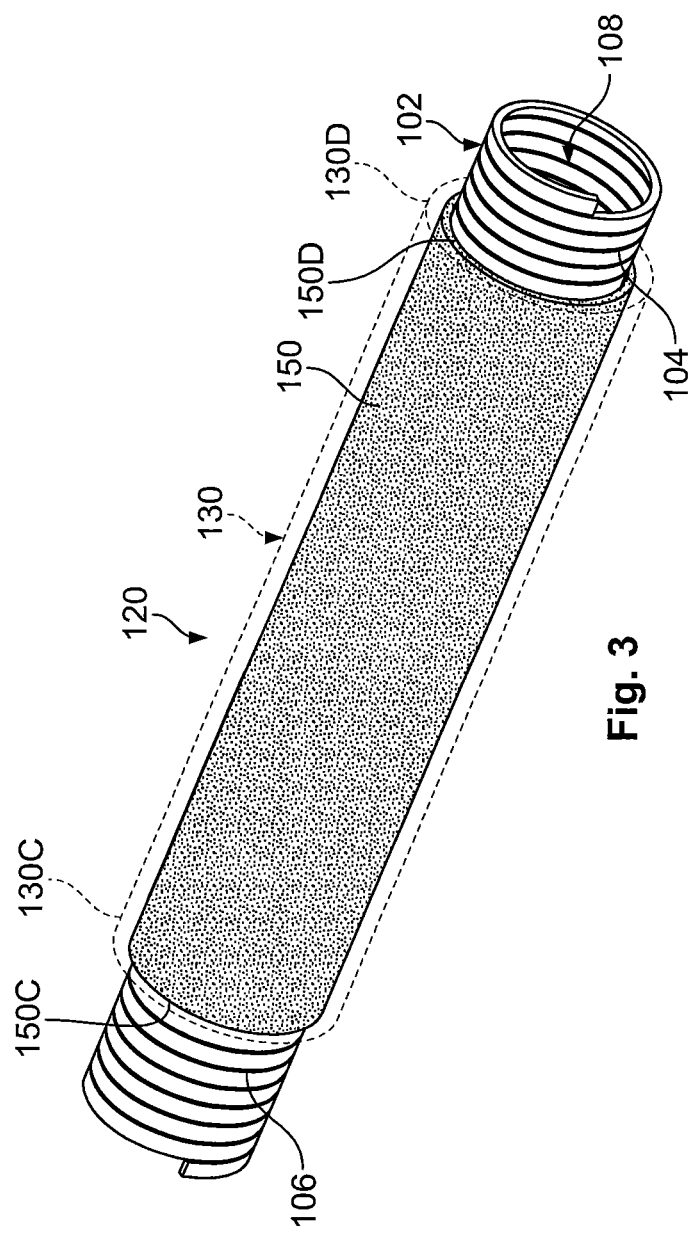
FIG. 3 is a perspective view of a splice body assembly and a holdout forming a part of the pre-expanded cover assembly of FIG. 1, wherein a splice body thereof is shown in transparency.

With reference to FIGS. 1-5, a cover assembly 100 according to some embodiments of the present invention is shown therein. The cover assembly 100 may be provided as a pre-expanded cover assembly unit 101 including a holdout device 102, as shown in FIGS. 1 and 2, wherein the cover assembly 100 is in an expanded state or position.

Figure 5:
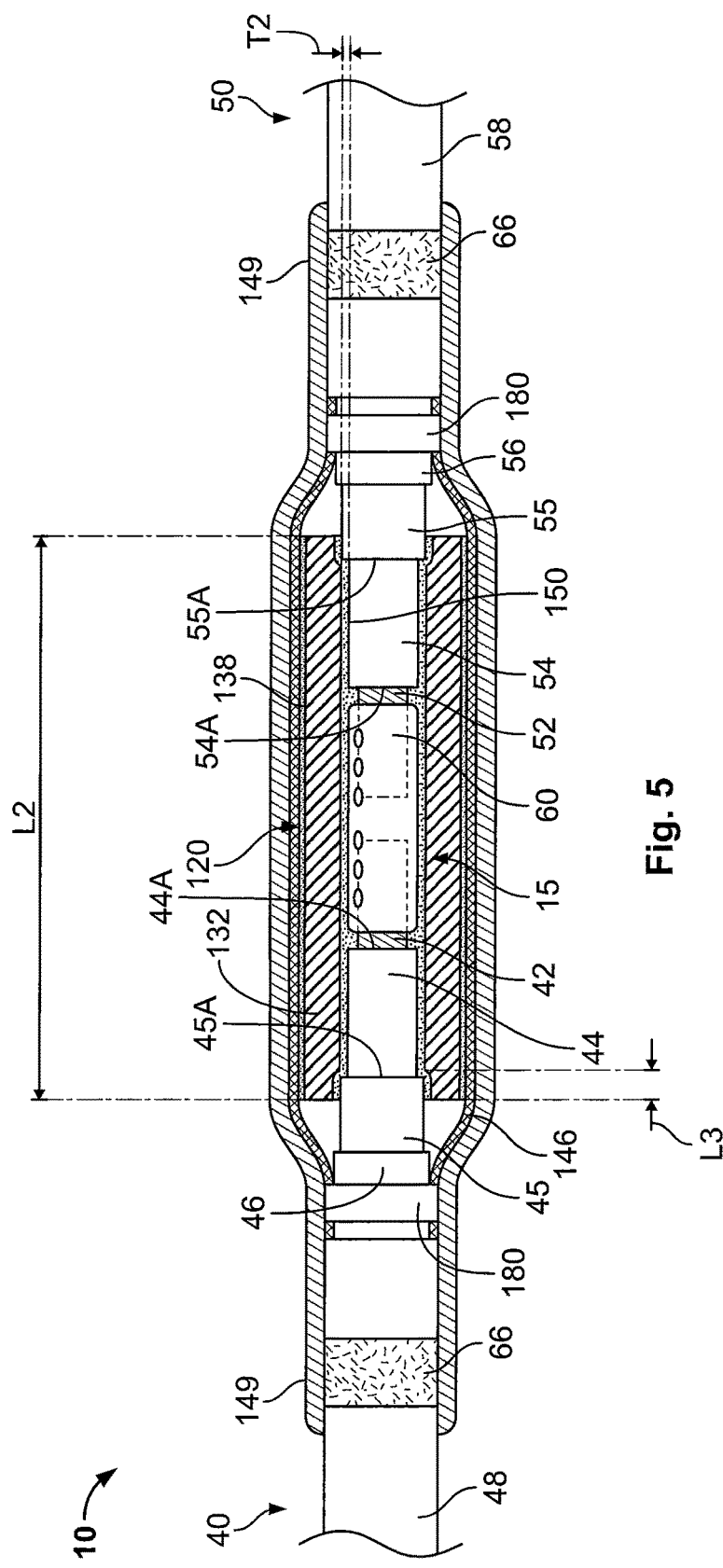
FIG. 5 is a cross-sectional view of a connection assembly including a cover assembly of the pre-expanded cover assembly unit of FIG. 1 mounted on a splice connection.

The cover assembly 100 may be used to cover and electrically insulate electrical substrates such as cables and connectors. The cover assembly 100 may be used to cover and seal a connection or splice between two or more cables 40, 50 including an electrical connector 60 to form a connection assembly 10 as shown in FIG. 5. According to some embodiments, the cables 40, 50 are concentric neutral cables. According to some embodiments, the cables 40, 50 are metal tape shielded or longitudinally corrugated (LC) metal shielded cables.

The cover assembly 100 may be deployed and mounted on the intended substrate in a retracted state or position as shown in FIG. 5 and discussed in more detail below. According to some embodiments, the cover assembly 100 is a cold shrink cover, meaning that it can be shrunk or retracted about the substrate without requiring the use of applied heat.

The cover assembly 100 includes a splice body assembly 120, an outer sleeve (or re-jacket) 140, and a metal shield mesh layer 146. The splice body assembly 120 includes a splice body 130 and a tubular or layer of a flowable, conformable high permittivity material or medium ("the conformable medium") 150. According to some embodiments and as discussed herein, the conformable medium of the layer 150 is a conformable, flowable, high electric permittivity (high-K) mastic.

The splice body 130 includes a tubular primary insulation sleeve or layer 132 and a semiconductor layer 138.

The cover assembly 100 has a lengthwise axis A-A. The splice body assembly 120, the outer sleeve 140, and the metal shield mesh layer 146 are provided as an integral, unitary structure extending lengthwise along the axis A-A. According to some embodiments, the cover assembly 100 is provided pre-installed and pre-expanded on the holdout 102.

The splice body 130 has opposed inner and outer surfaces 130A and 130B, and opposed axial terminal ends 130C, 130D. The splice body 130 is tubular and the inner surface 130A defines an axially extending conductor through passage 130E that communicates with opposed end openings 130F, 130G.

The primary insulation layer 132 is tubular and generally forms the bulk of the splice body 130 except for the semiconductor layer 138. The primary insulation layer 132 has an inner surface 132A defining the passage 130E.

The primary insulation layer 132 can be formed of any suitable material. According to some embodiments, the primary insulation layer 132 is formed of a dielectric or electrically insulative material. According to some embodiments, the primary insulation layer 132 is formed of an elastically expandable material. According to some embodiments, the primary insulation layer 132 is formed of an elastomeric material. According to some embodiments, the primary insulation layer 132 is formed of ethylene propylene diene monomer (EPDM) rubber. Other suitable materials may include liquid silicone rubber (LSR) or ethylene propylene rubber (EPR). According to some embodiments, the primary insulation layer 132 has a Modulus at 100 percent elongation (M100) in the range of from about 0.5 to 2.0 MPa.

According to some embodiments, the thickness of the primary insulation layer 132 is in the range from about 4 mm to 10 mm. According to some embodiments, the length L1 (FIG. 2) of the primary insulation layer 132 is in the range from about 250 mm to 750 mm.

The semiconductor layer 138 fully circumferentially surrounds the primary insulation layer 132. According to some embodiments, the semiconductor layer 138 is coextensive with the primary insulation layer 132.

The semiconductor layer 138 can be formed of any suitable electrically semiconductive material. According to some embodiments, the semiconductor layer 138 is formed of an elastically expandable material. According to some embodiments, the semiconductor layer 138 is formed of an elastomeric material. According to some embodiments, the semiconductor layer 138 is formed of carbon black and EPDM rubber. Other suitable materials may include carbon black and silicone.

The mastic layer 150 is tubular. The mastic layer 150 is adhered or bonded by its outer surface to the inner surface 130A of the splice body 130. The mastic layer 150 extends continuously from axial terminal end 150C to axial terminal end 150D.

According to some embodiments, the mastic layer 150 has a thickness T1 (FIG. 2) in the pre-expanded unit 101 in the range of from about 0.5 mm to 3 mm.

According to some embodiments and as illustrated, the mastic layer 150 spans at least a region extending from the end 130C to the end 130D of the splice body 130. That is, the mastic layer 150 fully covers and is co-extensive with the primary insulation layer 132 (i.e., ends 150C and 150D are substantially co-terminal with ends 130C and 130D, respectively), and is bonded to the primary insulation inner surface 130A from the end 130C to the end 130D.

The mastic 150 may be any suitable type of mastic having the necessary or desired properties to function as intended. In particular, the mastic 150 should be sufficiently soft, at temperatures in the intended cold-applied installation and use temperature range, that it can conform to surfaces of the cables 40, 50 as discussed below, and should be a high-K material having adequate electric permittivity and dielectric strength to provide electric stress control and interfacial dielectric strength at an electrical interface as discussed below. As used herein, "high-K material" means a material having a dielectric constant (i.e., relative permittivity) of at least 10.

According to some embodiments, the mastic 150 has a dielectric constant of at least about 10. According to some embodiments, the mastic 150 has a dielectric constant in the range of from about 10 to 30 and, in some embodiments, in the range of from about 15 to 25.

According to some embodiments, the mastic 150 has a volume resistivity in the range of from about $10^8$ to $10^{14}$ Ohm-cm.

According to some embodiments, the mastic 150 has a dielectric strength in the range of from about 250 to 700 Volts/mil.

According to some embodiments, the mastic 150 is a silicone rubber-based mastic.

According to some embodiments, the mastic 150 has a plasticity number in the range of from about 150 to 650 according to ISO 7323.

According to some embodiments, the mastic 150 has a density in the range of from about 1.3 to 1.6 g/cm$^3$.

The shield mesh layer 146 fully circumferentially surrounds the splice body 130. According to some embodiments, the shield mesh layer 146 includes opposed end sections that extend beyond the ends of the splice body 130 but do not extend as far out as the outer sleeve 140. The shield mesh layer 146 may be formed of braided or woven copper filaments, for example.

The outer sleeve 140 has opposed inner and outer surfaces 140A and 140B, and opposed ends 142A, 142B. The outer sleeve 140 is tubular and defines an axially extending conductor through passage 143 that communicates with opposed end openings at the ends 142A, 142B. When mounted on the holdout 102 as shown in FIGS. 1 and 2, outer sections 149 of the outer sleeve 140 are folded back on an intermediate section 148 of the outer sleeve 140 at annular folds 149A.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness of the outer sleeve 140 is in the range of from about 0.11 to 0.25 inch. According to some embodiments, the length of the outer sleeve 140 is in the range of from about 15 to 35 inches.

The holdout 102 can be formed of any suitable material. The holdout 102 has an outer surface 106 and defines a through passage 108. According to some embodiments, the holdout 102 includes a flexible strip 104 helically wound to form a rigid cylinder and having a pull tab or end segment 102A extending through the passage 108 as illustrated, for example. According to some embodiments, the holdout 102 is formed of a semi-rigid polymeric material. According to some embodiments, the holdout 102 is formed of polypropylene, ABS, or PVC. The holdout device 102 may be factory installed.

The splice body assembly 120, the cover assembly 100, and the pre-expanded unit 101 may be formed by any suitable method and apparatus. According to some embodiments, the mastic layer 150 is pre-mounted on the outer surface 106 of the holdout 102, and the splice body 130 is thereafter installed over the holdout 102 and the mastic layer 150.

According to some embodiments, the primary insulation layer 132 is formed by extruding. In particular, in some embodiments, the primary insulation layer 132 is formed of EPDM rubber and is formed by extruding.

In some embodiments, the cover assembly 100 is formed by the following manufacturing process: a) the mastic 150 is pre-mounted on the holdout 102; b) the primary insulation layer 132 and the semiconductor layer 138 are co-extruded as a continuous tube; c) optionally, the primary insulation layer 132 and the semiconductor layer 138 may then be cross-linked (e.g., by heating the co-extruded tube to a prescribed temperature for a prescribed time); d) the co-extruded tube is cut to form the primary insulation layer 132 and the semiconductor layer 138; and e) thereafter, the combined primary insulation layer 132 and semiconductor layer 138 structure (i.e., the splice body 130) is expanded, placed around the pre-mounted mastic 150 and the holdout 102 and permitted to contract about the mastic 150 and the holdout 102.

In some embodiments, the cover assembly 100 is formed by the following manufacturing process: a) the mastic 150 is pre-mounted on the holdout 102; b) the primary insulation layer 132 is extruded as a continuous tube; c) the semiconductor layer 138 is applied or coated onto the outer surface of the primary insulation layer 132 tube by painting, dipping or spraying, for example; d) the coated primary insulation layer tube is cut to form the primary insulation layer 132 and the semiconductor layer 138; and e) thereafter, the combined primary insulation layer 132 and semiconductor layer 138 structure (i.e., the splice body 130) is expanded, placed around the pre-mounted mastic 150 and the holdout 102 and permitted to contract about the mastic 150 and the holdout 102.

According to some embodiments, when mounted on the holdout 102, the splice body 130 is maintained in an elastically radially expanded state or position. According to some embodiment, in the expanded state the splice body 130 is expanded in the range of from about 400 to 200 percent of its relaxed diameter. As a result, the splice body 130 of the pre-expanded unit 101 will exert a radially compressive pressure or load on the mastic layer 150 (which is constrained on its interior side by the rigid holdout 102). According to some embodiments, this compressive load is in the range of from about 5 psi to 25 psi. According to some embodiments, in spite of this compressive loading, the mastic 150 will retain its general shape and position and will resist bleed out of oil, which might otherwise migrate within the interstices of the holdout 102.

Referring now to FIG. 5, the cover assembly 100 may be applied over a splice connection 15 between a pair of electrical power transmission cables 40, 50 to form a connection assembly 10. According to some embodiments, the cables 40, 50 are medium-voltage (e.g., between about 5 and 35 kV) or high-voltage (e.g., between about 46 and 230 kV) power transmission cables.

Figure 4:
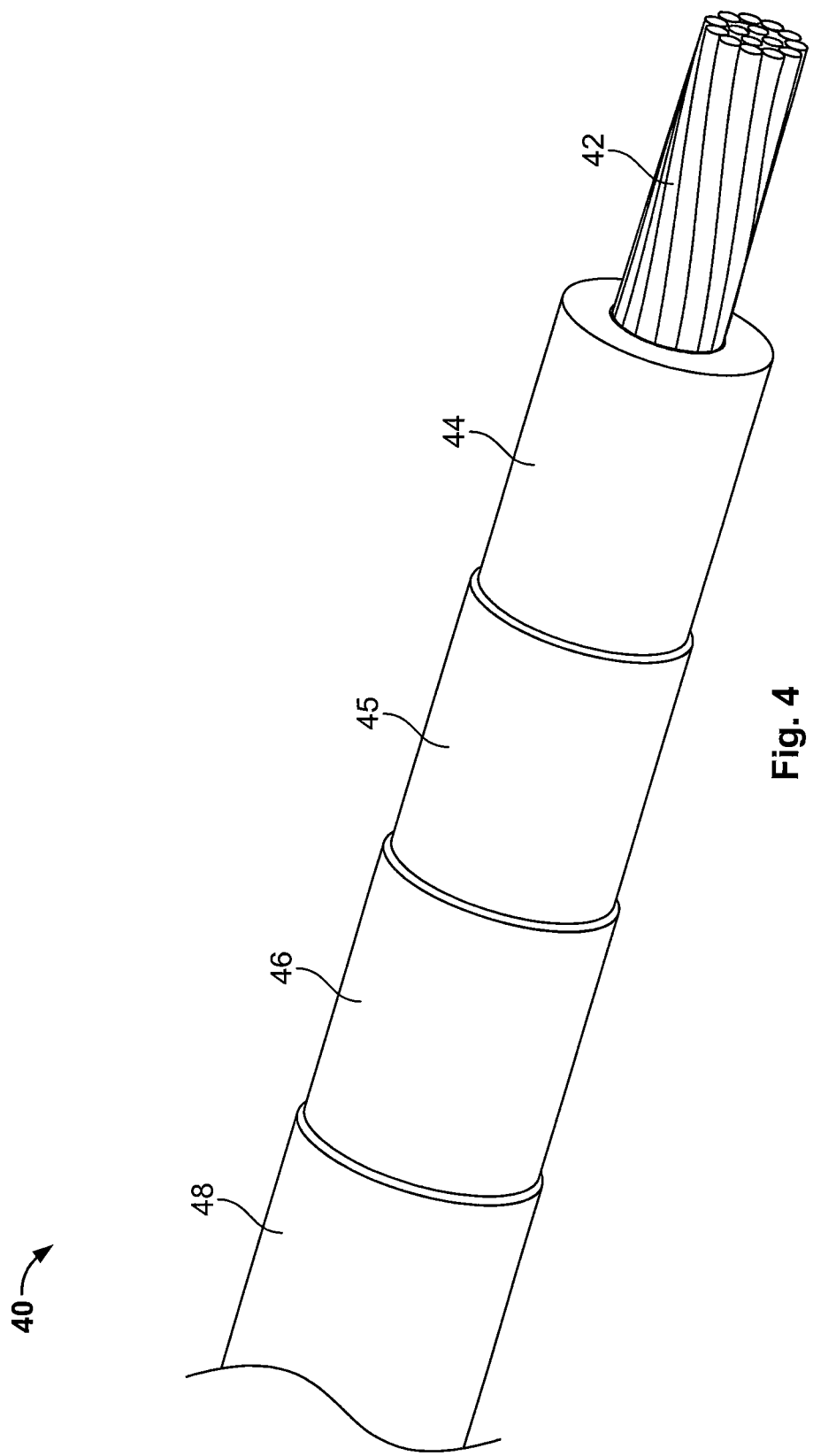
FIG. 4 is a fragmentary, perspective view of an exemplary polymeric insulated power transmission cable for use with the pre-expanded cover assembly unit of FIG. 1.

As shown in FIG. 4, the cable 40 includes a primary electrical conductor 42, a polymeric insulation layer 44, a semiconductor layer 45, a metal electromagnetic radiation shield layer 46, and a jacket 48, with each component being concentrically surrounded by the next.

According to some embodiments and as shown, the shield layer 46 is a metal tape, foil, strip or sheath fully circumferentially surrounding the semiconductor layer 45 along the length of the cable. The metal strip may be longitudinally or helically wrapped about the semiconductor layer 45, for example. According to some embodiments, the cable 40 is an LC shielded cable and the shield layer 46 is a thin corrugated metal layer. In other embodiments, the shield layer 46 may include individual wires, which may be helically wound about the semiconductor layer 45.

The primary conductor 42 may be formed of any suitable electrically conductive materials such as copper (solid or stranded). The polymeric insulation layer 44 may be formed of any suitable electrically insulative material such as cross-linked polyethylene (XLPE) or EPR. The semiconductor layer 45 may be formed of any suitable semiconductor material such as carbon black with silicone. The shield layer 46 may be formed of any suitable material such as copper. The jacket 48 may be formed of any suitable material such as EPDM rubber or PVC.

The cable 50 (FIG. 5) is similarly constructed with a primary electrical conductor 52, a polymeric insulation layer 54, a semiconductor layer 55, a metal shield layer 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 5 such that a segment of each layer extends beyond the next overlying layer.

The pre-expanded unit 101 is slid over one of the cables 40, 50. According to some embodiments, the inside diameter of the holdout 102 is greater than the outer diameter of each cable 40, 50 and the connector 60 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connector that are to be received in the cover assembly 100. The pre-expanded unit 101 may be retained or parked on a cable 40, 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 5. The connector 60 may be any suitable type of connector such as a metal crimp connector.

The pre-expanded unit 101 is then slid into position over the connector 60. The holdout 102 is then removed from the cover assembly 100, thereby permitting the elastomeric sleeves 130, 140 to relax and radially retract about the cables 40, 50 and the connector 60 as shown in FIG. 5, as discussed in more detail below. According to some embodiments, the mastic 150 overlaps and engages the semiconductor layers 45, 55 of the cables 40, 50.

The mastic layer 150 preferentially adheres to the inner surface 130A of the splice body 130 and separates or releases from the holdout strip 104. The mastic layer 150 is thus sandwiched between the splice body 130 and the cables 40, 50 and directly engages the interface surfaces of the cables 40, 50 as shown in FIG. 5. The splice body 130 is not fully recovered to its relaxed state, and therefore continues to apply a persistent radially compressive load or pressure to the mastic layer 150.

The shield mesh 146 is rolled outwardly onto the semiconductor layers 45, 55 as shown in FIG. 5. A retainer 180 (e.g., a metal mesh web or clamp) can be wrapped about each cable 40, 50 as also shown in FIG. 5 to secure the end edges of the shield mesh 146. The retainers 180 may be wrapped about exposed ends of the shield layers 46, 56 to electrically connect the shield mesh 146 to the shield layers 46, 56.

Strips of flowable sealant 66 (FIG. 5) are applied to the outer surfaces of the cable jackets 48, 58. According to some embodiments, the sealant 66 is a mastic. The operator then rolls each of the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 66 to provide a moisture seal. According to some embodiments, the axial length of overlap between each extension section 149 and the underlying jacket 48, 58 is at least 1 inch.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 may thereby effect a liquid tight seal at the interfaces between the extension sections 149 and the cable jackets 48, 58 and at the interfaces between the cable jackets 48, 58 and the outer sleeve 140. These seals can protect the cable and the splice from the ingress of environmental moisture.

The relaxed inner diameter of the splice body 130 is less than at least the outer diameter of the cable insulation layers 44, 54. Therefore, the splice body 130 exerts a radially inwardly compressive or clamping force or pressure (due to elastic tension) onto the cables 40, 50 and the mastic layer 150. According to some embodiments, the relaxed inner diameter of the primary insulation layer 132 is at least 10% less than the smallest diameter cable upon which the cover assembly 100 is intended to be installed.

The cover assembly 100 is thereby fully installed to form the connection assembly 10 as shown in FIG. 5. As shown, the splice body assembly 120 and the splice connection 15 are relatively arranged and configured such that the mastic layer 150 forms an axially and circumferentially continuous tube surrounding the cables 40, 50 and the connector 60 from the cable semiconductor layer 45 to the cable semiconductor layer 55 (and also overlapping the semiconductor layers 45, 55). The mastic layer 150 is thus interposed between and engages each of the inner surface 130A of the splice body 130 and opposing interface surfaces of the connector 60, the cable insulations 44, 54, and the cable semiconductor layers 45, 55. That is, the mastic layer 150 surrounds and engages the cables 40, 50 and the connector 60 across the entirety of the region from the end 130C to the end 130D of the splice body 130.

Notably, in this manner, the high permittivity void filling mastic 150 extends along (and engages the cable throughout) the entire electrical interface. The electrical interface is here defined as the interface between the splice body assembly 120 and the cables 40, 50 extending axially from the terminal edge 45A of the cable semiconductor layer 45 to the terminal edge 44A of the cable insulation 44 and from the terminal edge 55A of the cable semiconductor layer 55 to the terminal edge 54A of the cable insulation 54. The high permittivity void filling mastic 150 also extends along the entirety of the connector region (i.e., the axial extent of the connector 60).

According to some embodiments, the mastic layer 150 has a length L2 (when installed; FIG. 5) in the range of from about 250 to 750 mm.

According to some embodiments, the mastic layer 150, when installed, has a thickness T2 (FIG. 5) in the range of from about 1 to 8 mm.

In some embodiments, the mastic layer 150 overlaps the cable semiconductor layers 45, 55 a distance L3 (FIG. 5) in the range of from about 15 to 50 mm.

The pre-expanded unit 101, and particularly the splice body assembly 120, and the mastic layer 150, can provide significant advantages during installation and in service. The electrical interface between a splice body and spliced cables is typically the weakest link in the insulation system of a medium or high voltage joint. In particular, joint failures tend to be initiated by insulation failures along this electrical interface, which is the interface between the cable insulation and the joint or splice body extending from the Faraday cage to the stress cone, which may be referred to as the creepage distance.

Electrical interfaces between cables and splice bodies may be electrically weak compared to the bulk dielectric strength of the primary splice body insulation for a number of reasons. The interface between the cable and the splice body is imperfect and contains small amounts of air (e.g., in microvoids) that electrically ionize in the electrical field and can cascade into complete dielectric breakdown. The cable insulation is exposed during installation and can become contaminated with water or other conductive contaminants.

To address the foregoing concerns, it is known in the prior art to hand apply silicone grease along the interface prior to installation of the splice body to fill voids and increase dielectric strength. However, problems occur when the grease is contaminated during installation or partially applied or not applied at all, which can lead to dielectric breakdown.

Apparatus and methods according to embodiments of the present invention can address the foregoing concerns by providing a high permittivity, high dielectric strength, conformable mastic layer 150 integrally applied with the cold-shrink splice body 130 to the interface surfaces (including the electrical interface surfaces) of the cables 40, 50 (while also engaging the splice body interface surface 130A), which increases the electrical reliability of the electrical interfaces and may at the same time remedy the installation deficiencies as described above for silicone grease.

The high permittivity, high dielectric strength mastic layer 150 (particularly when comprised of silicone rubber-based mastic as described hereinabove that remains flowable at room temperature) serves as a flowable, conformable medium between the splice body 130 and the cables 40, 50 that provides electrical stress control in the area over the central connector 60, the insulating interfaces of the cable insulation 44, 54, and the cutback sections of the semiconductor layers 45, 55. The mastic layer 150 extending the entire length of the splice body 130 (i.e., from end 130C to end 130D) and the entire electrical interface (not just over the connector and cable semiconductor layer cutbacks) can thus provide increased electrical stress control, interfacial dielectric strength, and electrical reliability.

According to some embodiments, the mastic 150 can flow at temperatures in the intended service range, including at room temperature. In some embodiments, the mastic 150 can flow at least at temperatures in the range of from about −20° C. to 50° C. As such, the cover assembly 100 can be effectively and reliably cold-applied to the splice.

The mastic layer 150 applied and retained under the elastic pressure of the partially radially expanded splice body 130 will flow and conform to the irregularities of the exposed surfaces of the cables 40, 50 and the inner surface 130A of the splice body 130, thereby eliminating air voids (in surface microvoids or macrovoids) and electrically ionizable sites.

The mastic layer 150 can engulf and isolate contaminants to thereby increase the overall dielectric strength of the interface.

The mastic layer 150 can be factory-applied to the splice body 130 (to form the splice body assembly 120) and factory-mounted on the holdout 102 (to form the pre-expanded unit 101 or a part thereof), and can be integrally applied to the splice connection 15 in a single step with the splice body 130. As such, the risks that an installer may forget to apply the mastic or that the mastic may be contaminated are eliminated. The factory-applied mastic 150 also eliminates the need for separate application of mastics, Faraday cages, and void filling greases during the product installation process as may be required for known products and installation methods.

According to some embodiments (e.g., when formed from a silicone-based mastic as described hereinabove), the mastic layer 150 is formulated to be stable under the elastic compression force of the splice body 130 while expanded on the holdout 102. According to some embodiments, the mastic layer 150 is resistant to oil bleed out under pressure and does not migrate in between the interstices of the spiral holdout 102.

According to some embodiments, an electrical connector of a different type may be used in place of the shear bolt connector 60.

While an "all-in-one" cover assembly 100 has been shown and described, the splice body assembly 120 may be provided independently. For example, the splice body assembly 120 may be pre-mounted on the holdout 102 to form a pre-expanded splice body assembly without the shield mesh 146 and jacket 140 being mounted thereover. A shield layer and jacket may be separately installed on the splice connection 15 after the splice body assembly 120 has been installed.

Figure 6:
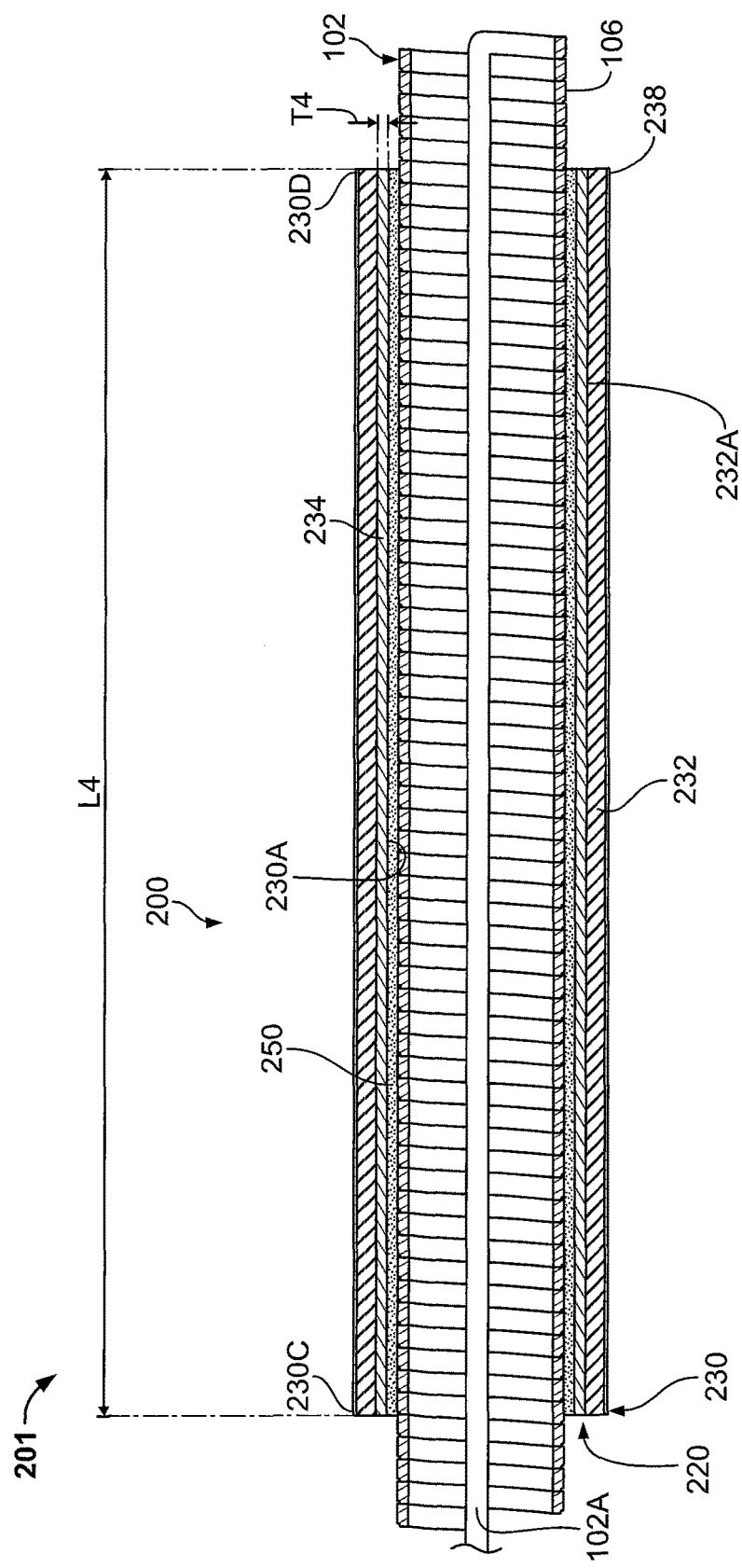
FIG. 6 is a lengthwise cross-sectional view of a pre-expanded cover assembly unit according to further embodiments of the present invention.
Figure 7:
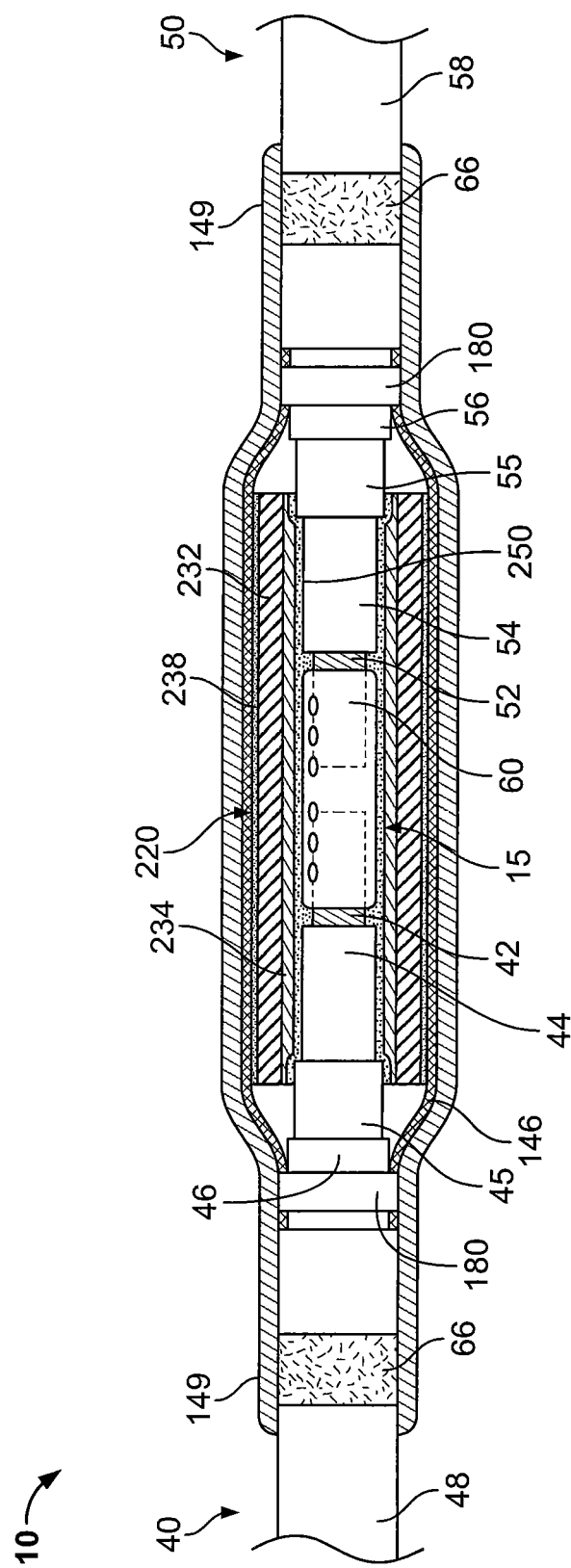
FIG. 7 is a cross-sectional view of a connection assembly including a cover assembly of the pre-expanded cover assembly unit of FIG. 6 mounted on a splice connection.

With reference to FIGS. 6 and 7, a cover assembly 200 according to further embodiments of the present invention is shown therein. The cover assembly 200 may be provided as a pre-expanded cover assembly unit 201 including a holdout device 102, as shown in FIG. 6, wherein the cover assembly 200 is in an expanded state or position.

The cover assembly 200 may be used to cover and electrically insulate electrical substrates such as cables and connectors as described above with regard to the cover assembly 100. The cover assembly 200 may be used to cover and seal a connection or splice between two or more cables 40, 50 including an electrical connector 60 to form a connection assembly 10 as shown in FIG. 7. The cover assembly 200 may be deployed and mounted on the intended substrate in a retracted state or position as described above with regard to the cover assembly 100 and as shown in FIG. 7.

The cover assembly 200 includes a splice body assembly 220. The splice body assembly 220 includes a splice body 230 and a tubular layer of a flowable, high electrical permittivity, conformable material or medium ("the conformable medium") 250. The pre-expanded cover assembly unit 201 may also include an outer sleeve corresponding to the outer sleeve (or re-jacket) 140 and a metal shield corresponding to the metal shield mesh layer 146, which components are shown in FIG. 7 as parts of the connection assembly 10.

The splice body 230 includes a tubular primary insulation sleeve or layer 232, an integral semiconductor layer 238, and an integral, tubular, elastomeric, electrical stress control or high electrical permittivity (high-K) layer 234.

The primary insulation layer 232, the semiconductor layer 238, and the medium 250 may be formed in the same manner and of the same materials as described above for the primary insulation layer 132, the semiconductor layer 138, and the medium 150, respectively.

The cover assembly 200 differs from the cover assembly 100 in the further provision of the elastomeric, high permittivity layer 234 between the mastic 250 and the primary insulation layer 232. The high permittivity layer 234 is adhered or bonded by its outer surface to the inner surface 230A of the splice body 230.

According to some embodiments and as illustrated, the stress control layer 234 spans at least a region extending from the end 230C to the end 230D of the splice body 230. That is, the high permittivity layer 234 fully covers and is bonded to the primary insulation inner surface 232A from the end 230C to the end 230D.

The high permittivity layer 234 can be formed of any suitable elastically expandable, high-K material. According to some embodiments, the high permittivity layer 234 is formed of an elastomeric material. According to some embodiments, the high permittivity layer 234 is formed of EPDM rubber. Other suitable materials may include silicone rubber. According to some embodiments, the high permittivity layer 234 has a Modulus at 100 percent elongation (M100) in the range of from about 0.5 to 2.0 MPa.

According to some embodiments, the high permittivity layer 234 has a dielectric constant of at least about 10. According to some embodiments, the high permittivity layer 234 has a dielectric constant in the range of from about 10 to 30 and, in some embodiments, 15 to 25.

According to some embodiments, the high permittivity layer 234 has a volume resistivity in the range of from about $10^{10}$ to $10^{14}$ Ohm-cm.

According to some embodiments, the high permittivity layer 234 has a dielectric strength in the range of from about 300 to 700 Volts/mil.

According to some embodiments, the thickness T4 (FIG. 6) of the high permittivity layer 234 is in the range from about 1 to 3 mm. According to some embodiments, the length L4 of the high permittivity layer 234 is in the range from about 250 to 750 mm.

The splice body assembly 220, the cover assembly 200, and the pre-expanded unit 201 may be formed by any suitable method and apparatus. According to some embodiments, the mastic layer 250 is pre-mounted on the outer surface 206 of the holdout 102, and the splice body 230 is thereafter installed over the holdout 102 and the mastic layer 250.

According to some embodiments, the primary insulation layer 232 and the high permittivity layer 234 are formed by extruding.

In some embodiments, the cover assembly 200 is formed by the following manufacturing process: a) the mastic 250 is pre-mounted on the holdout 102; b) the primary insulation layer 232, the high permittivity layer 234 and the semiconductor layer 238 are co-extruded as a continuous tube; c) optionally, the primary insulation layer 232, the high permittivity layer 234 and the semiconductor layer 238 may then be cross-linked (e.g., by heating the co-extruded tube to a prescribed temperature for a prescribed time); d) the co-extruded tube is cut to form the primary insulation layer 232, the high permittivity layer 234 and the semiconductor layer 238; and e) thereafter, the combined primary insulation layer 232, high permittivity layer 234 and semiconductor layer 238 structure (i.e., the splice body 230) is expanded, placed around the pre-mounted mastic 250 and the holdout 102 and permitted to contract about the mastic 250 and the holdout 102.

In some embodiments, the cover assembly 200 is formed by the following manufacturing process: a) the mastic 250 is pre-mounted on the holdout 102; b) the primary insulation layer 232 and the high permittivity layer 234 are extruded as a continuous tube; c) the semiconductor layer 238 is applied or coated onto to the outer surface of the primary insulation layer 232 tube by painting, dipping or spraying, for example; d) the coated multi-layer tube is cut to form the primary insulation layer 232, the high permittivity layer 234 and the semiconductor layer 238; and e) thereafter, the combined primary insulation layer 232, high permittivity layer 234 and semiconductor layer 238 structure (i.e., the splice body 230) is expanded, placed around the pre-mounted mastic 250 and the holdout 102 and permitted to contract about the mastic 250 and the holdout 102.

The internal, integral, elastomeric high permittivity layer 234 serves to provide enhanced electrical stress control for higher voltage class cables.

Figure 8:
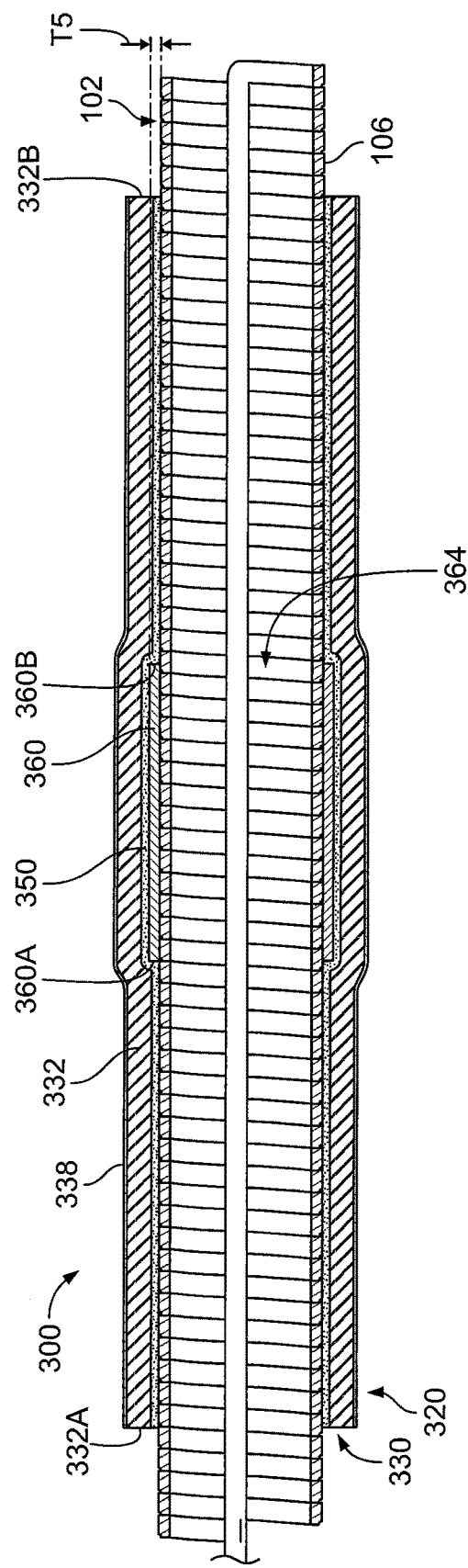
FIG. 8 is a lengthwise cross-sectional view of a pre-expanded cover assembly unit according to further embodiments of the present invention.
Figure 9:
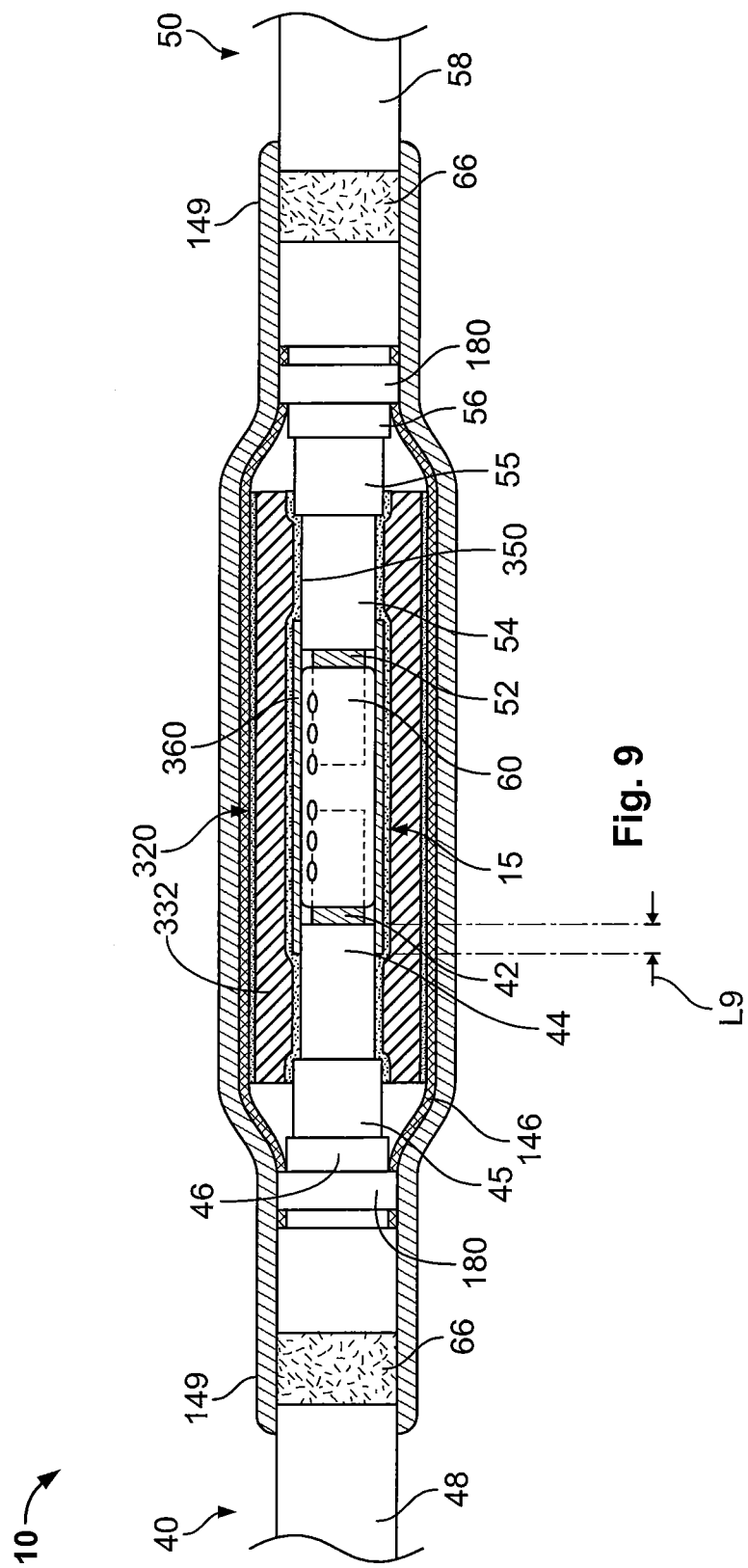
FIG. 9 is a cross-sectional view of a connection assembly including a cover assembly of the pre-expanded cover assembly unit of FIG. 8 mounted on a splice connection.

With reference to FIGS. 8 and 9, a cover assembly 300 according to further embodiments of the present invention is shown therein. The cover assembly 300 may be provided as a pre-expanded cover assembly unit 301 including a holdout device 102, as shown in FIG. 8, wherein the cover assembly 300 is in an expanded state or position.

The cover assembly 300 may be used to cover and electrically insulate electrical substrates such as cables and connectors as described above with regard to the cover assembly 100. The cover assembly 300 may be used to cover and seal a connection or splice between two or more cables 40, 50 including an electrical connector 60 to form a connection assembly 10 as shown in FIG. 9. The cover assembly 300 may be deployed and mounted on the intended substrate in a retracted state or position as described above with regard to the cover assembly 100 and as shown in FIG. 9.

The cover assembly 300 includes a splice body assembly 320. The splice body assembly 320 includes a splice body 330 and a tubular layer of a flowable, high electrical permittivity, conformable material or medium ("the conformable medium") 350. The pre-expanded cover assembly unit 301 may also include an outer sleeve corresponding to the outer sleeve (or re-jacket) 140 and a metal shield corresponding to the metal shield mesh layer 146, which components are shown in FIG. 9 as parts of the connection assembly 10.

The splice body 330 includes a tubular primary insulation sleeve or layer 332 and an integral semiconductor layer 338. The primary insulation layer 332, the semiconductor layer 338, and the medium 350 may be formed in the same manner and of the same materials as described above for the primary insulation layer 132, the semiconductor layer 138, and the medium 150, respectively.

The cover assembly 300 differs from the cover assembly 100 in the further provision of a tubular, elastomeric Faraday cage layer or sleeve 360 interposed between the mastic 350 and the holdout 102. The Faraday cage sleeve 360 has opposed axial ends 360A, 360B and a Faraday cage interface surface 362 defining a passage 364 extending from end 360A to end 360B. The ends 360A and 360B are spaced apart from the adjacent ends 332A and 332B of the primary insulation layer 332.

The Faraday cage sleeve 360 may be formed of a suitable elastically conductive elastomer. According to some embodiments, the Faraday cage sleeve 360 is formed of EPR rubber. Other suitable materials may include silicone rubber. According to some embodiments, the Faraday cage sleeve 360 has a Modulus at 100 percent elongation (M100) in the range of from about 0.5 to 3 MPa.

According to some embodiments, the Faraday cage sleeve 360 has a volume resistivity in the range of from about $0.5 \times 10^2$ to $10^3$ Ohm-cm.

According to some embodiments, the thickness T5 (FIG. 8) of the Faraday cage sleeve 360 is in the range from about 1 to 3 mm. According to some embodiments, the length L5 of the Faraday cage sleeve 360 is in the range from about 75 to 225 mm.

In use, the Faraday cage sleeve 360 may form a Faraday cage to provide an equal potential volume about the connector 60 so that an electric field is cancelled in the surrounding air voids. As shown in FIG. 9, the cover assembly 300 can be installed on the splice connection 15 from the holdout 102 in the same manner as described above with regard to the cover assembly 100. The installed Faraday cage sleeve 360 extends axially from the cable insulation 44 to the cable insulation 54, and overlaps each of the insulations 44, 54. In some embodiments, the Faraday cage sleeve 360 overlaps each insulation layer 44, 54 a distance L9 (FIG. 9) in the range of from about 15 to 50 mm.

The purpose of the elastomeric Faraday cage sleeve 360 is to provide electrical stress control in the event that the mastic 350 cannot fill all of the voids around the connector 60. This may be desirable or required on larger cables where the void filling volume is large, and for higher voltage cables where the electric stress is high.

The splice body assembly 320, the cover assembly 300, and the pre-expanded unit 301 may be formed by any suitable method and apparatus. According to some embodiments, the mastic layer 350 is pre-mounted on the outer surface 106 of the holdout 102, and the splice body 330 is thereafter installed over the holdout 102 and the mastic layer 350.

According to some embodiments, the primary insulation layer 332 is formed by extruding.

In some embodiments, the cover assembly 300 is formed by the following manufacturing process: a) the Faraday cage sleeve 360 is expanded and mounted on the holdout 102; b) the mastic 350 is pre-mounted over the Faraday cage sleeve 360 and the holdout 102; and c) the splice body 330 is expanded, placed around the pre-mounted Faraday cage sleeve 360 and mastic 350 and the holdout 102, and permitted to contract about the mastic 350 and the holdout 102. The Faraday cage sleeve 360 may be formed by any suitable method such as molding or extrusion. The splice body 330 may be formed using the method or methods as described above for the cover assembly 100.

According to further embodiments, the cover assembly 300 may also include an integral, elastomeric high permittivity layer corresponding to the elastomeric high permittivity layer 234 mounted between the mastic 350 and the primary insulation layer 332.

According to further embodiments, the Faraday cage sleeve 360 may be provided separately from the mastic 350 and the splice body 330. In this case, the installer may be provided with the expanded cover assembly 101 and the Faraday cage sleeve 360. The Faraday cage sleeve 360 may be pre-mounted on a suitable holdout. The installer first installs the Faraday cage sleeve 360 on the splice connection 15 or other substrate, and thereafter installs the cover assembly 100 over the Faraday cage sleeve 360. Alternatively, where an integral, elastomeric high permittivity layer 234 is also to be provided, the installer is provided with the expanded cover assembly 201 and installs the cover assembly 200 over the pre-installed Faraday cage sleeve 360.

Figure 10:
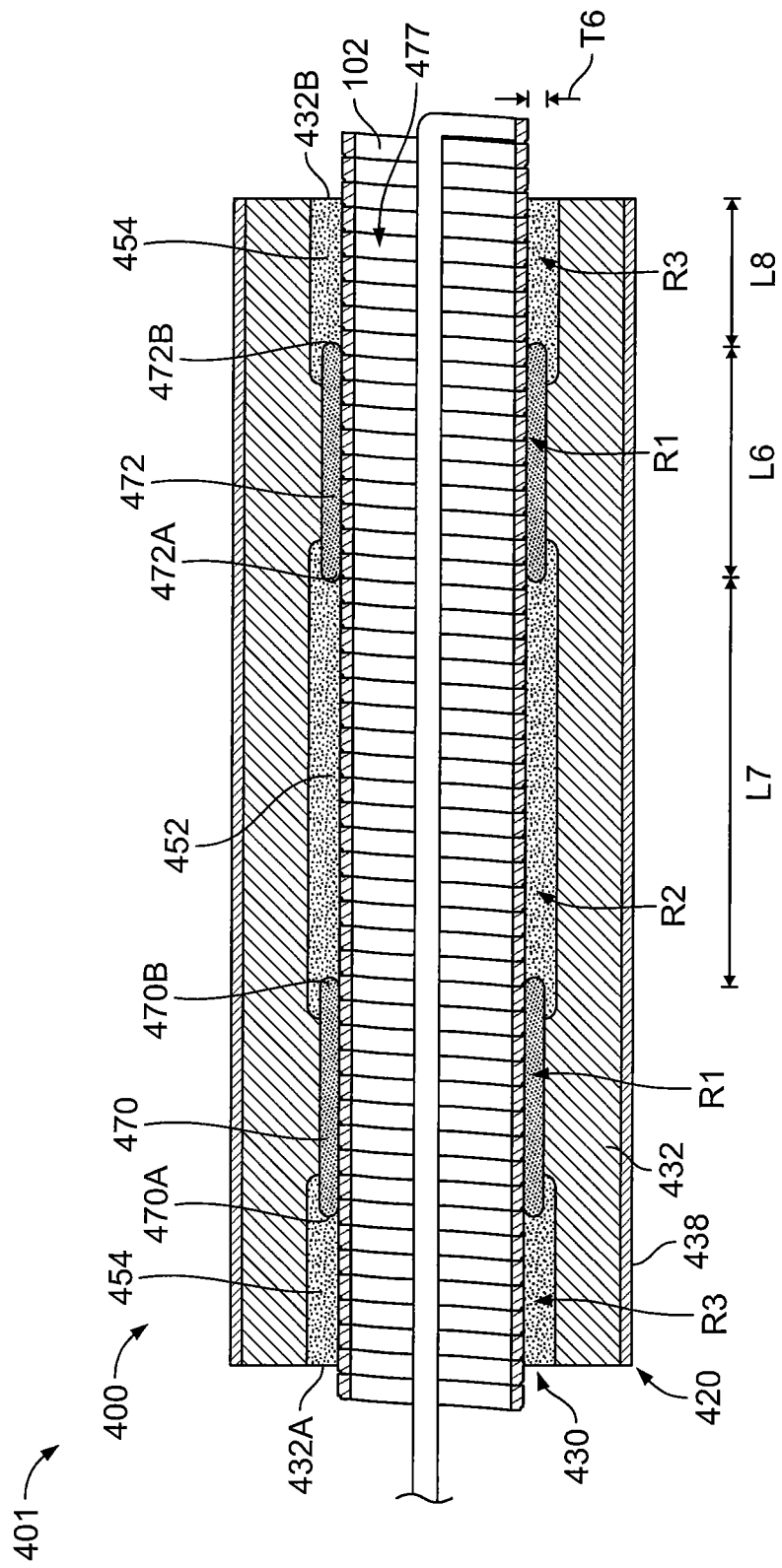
FIG. 10 is a lengthwise cross-sectional view of a pre-expanded cover assembly unit according to further embodiments of the present invention.
Figure 11:
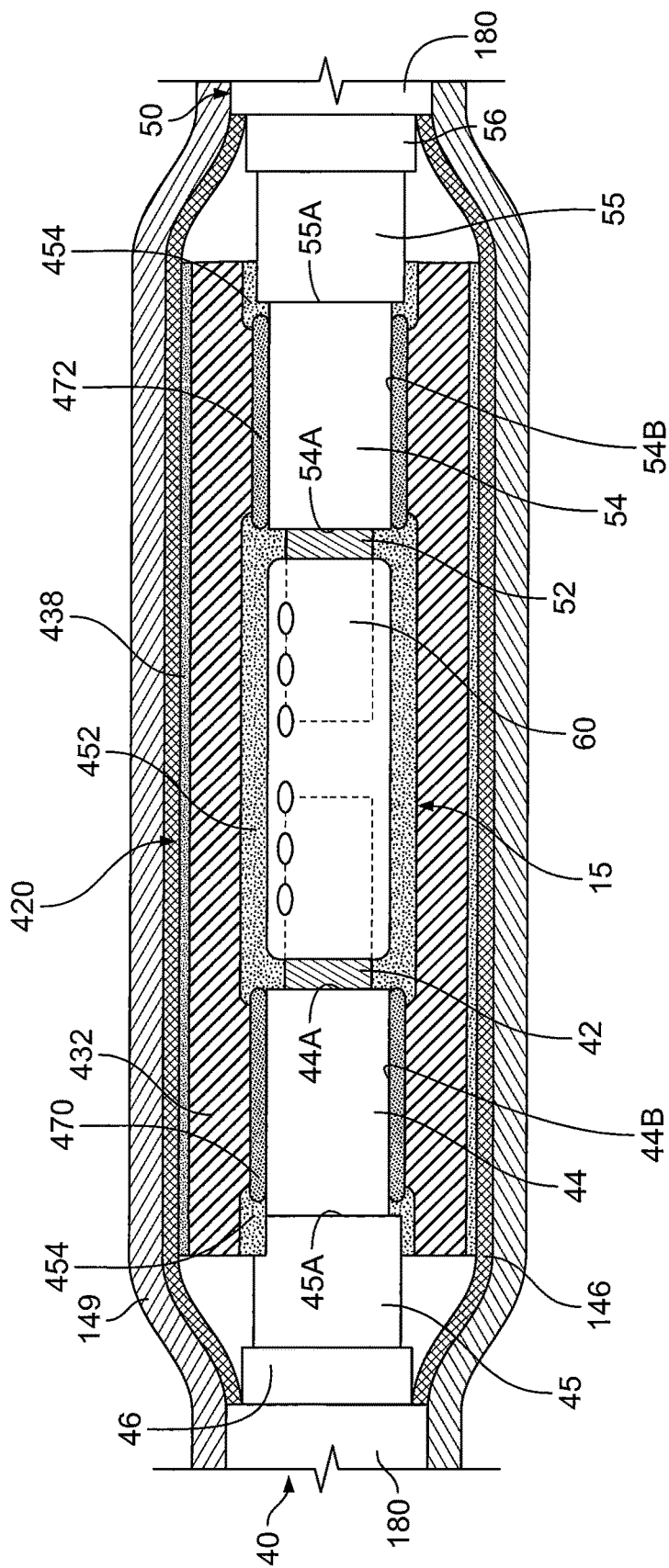
FIG. 11 is a cross-sectional view of a connection assembly including a cover assembly of the pre-expanded cover assembly unit of FIG. 10 mounted on a splice connection.

With reference to FIGS. 10 and 11, a cover assembly 400 according to further embodiments of the present invention is shown therein. The cover assembly 400 may be provided as a pre-expanded cover assembly unit 401 including a holdout device 102, as shown in FIG. 10, wherein the cover assembly 400 is in an expanded state or position.

The cover assembly 400 may be used to cover and electrically insulate electrical substrates such as cables and connectors as described above with regard to the cover assembly 100. The cover assembly 40Q may be used to cover and seal a connection or splice between two or more cables 40, 50 including an electrical connector 60 to form a connection assembly 10 as shown in FIG. 11. The cover assembly 400 may be deployed and mounted on the intended substrate in a retracted state or position as described above with regard to the cover assembly 100 and as shown in FIG. 11.

The cover assembly 400 includes a splice body assembly 420. The splice body assembly 420 includes a splice body 430, three axially distributed, tubular layers of a flowable, high electrical permittivity, conformable material or medium 452, 454, and two axially distributed, tubular layers of a flowable, electrically insulating, conformable material or medium 470, 472. The pre-expanded cover assembly unit 401 may also include an outer sleeve corresponding to the outer sleeve (or re-jacket) 140 and a metal shield corresponding to the metal shield mesh layer 146, which components are shown in FIG. 11 as parts of the connection assembly 10.

The splice body 430 includes a tubular primary insulation sleeve or layer 432 and an integral semiconductor layer 438. The primary insulation layer 432, the semiconductor layer 438, and the high permittivity mediums 452, 454 may be formed in the same manner and of the same materials as described above for the primary insulation layer 132, the semiconductor layer 138, and the medium 150, respectively.

The cover assembly 400 differs from the cover assembly 100 in the further provision of the tubular, electrically insulating mastic layers 470, 472 interposed the primary insulation layer 432 and the holdout 102 and axially spanning regions R1. The adjacent or proximal ends 470B, 472A of the insulating mastic layers 470, 472 are spaced apart from one another so that the high permittivity mastic layer 452 axially spans a region R2 extending from the mastic end 470B to the mastic end 472A. The opposing or distal ends 470A, 472B of the insulating mastic layers 470, 472 are spaced apart from the ends 432A, 432B of the primary insulation layer 432 so that the high permittivity mastic layers 454 axially span opposed regions R3 extending from insulating mastic end 470A to the primary insulation end 432A and from insulating mastic end 472B to primary insulation end 432B, respectively. The inner surfaces of the insulating mastic layers 470, 472 and the high permittivity mastic layers 452, 454 collectively define a passage 477 extending from end 432A to end 432B.

The mastics 470, 472 may be any suitable type of mastic having the necessary or desired properties to function as intended. In particular, the mastics 470, 472 should be sufficiently soft, at temperatures in the intended cold-applied installation and use temperature range, that it can conform to surfaces of the cables 40, 50 as discussed below, and should be an electrically insulating material having adequate conformability and dielectric strength to provide electrical insulation and interfacial dielectric strength at an electrical interface as discussed below. As used herein, "electrically insulating material" means a material having a dielectric strength of at least 250 volts/mil.

The insulating mastics 470, 472 each have a substantially lower dielectric constant (lower relative permittivity) than the high permittivity mastics 452, 454. According to some embodiments, the mastics 470, 472 have a dielectric constant of at least about 2. According to some embodiments, the mastics 470, 472 have a dielectric constant in the range of from about 2 to 8 and, in some embodiments, in the range of from about 4 to 8.

According to some embodiments, the mastics 470, 472 have a volume resistivity in the range of from about $10^{12}$ to $10^{15}$ Ohm-cm.

According to some embodiments, the mastics 470, 472 have a dielectric strength in the range of from about 250 to 800 Volts/mil.

According to some embodiments, the mastics 470, 472 are silicone rubber-based mastics.

According to some embodiments, the mastics 470, 472 have a plasticity number in the range of from about 150 to 650 according to ISO 7323.

According to some embodiments, the mastics 470, 472 have a density in the range of from about 1.3 to 1.6 g/cm$^3$.

According to some embodiments, the thickness T6 (FIG. 10) of each of the mastic layers 470, 472 is in the range from about 1 to 3 mm. According to some embodiments, the length L6 of each of the mastics 470, 472 is in the range from about 30 to 70 mm.

According to some embodiments, the length L7 of the portion of the high permittivity mastic layer 452 extending between the ends 470B and 472A is in the range from about 130 to 360 mm. According to some embodiments, the length L8 of the portion of the high permittivity mastic layers 454 extending between the ends 470A and the ends 432A and 432B, respectively, is in the range from about 65 to 170 mm.

In use and as shown in FIG. 11, the cover assembly 400 can be installed on the splice connection 15 from the holdout 102 in the same manner as described above with regard to the cover assembly 100. As shown in FIG. 11, each insulating mastic layer 470, 472 is interposed between and engages each of the inner surface 430A of the splice body 430 and opposing interface surfaces 44B, 54B of the cable insulation layers 44, 54 and the cable semiconductor layers 45, 55. The splice body assembly 420 is configured and positioned relative to the splice connection 15 such that each insulating mastic layer 470, 472 surrounds and engages the cable insulation 44, 54 across the most of the regions of the exposed insulation 44, 54. According to some embodiments, each insulating mastic layer 470, 472 surrounds and engages the cable insulation 44, 54 at least from a terminal edge 44A, 54A of the insulation layer 44, 54 to the proximal edge of the adjacent high permittivity mastic layer 454 such that the entireties of the exposed insulations 44, 54 are covered by the mastics 454, 470, 472. The high permittivity mastic layers 452, 454 surround the terminal edges 45A, 55A of the semiconductor layers 45, 55 and overlap adjacent sections of the semiconductor layers 45, 55 and the cable insulations 44, 54.

Thus, it can be seen that in some embodiments (e.g., as shown in FIG. 11), the splice body assembly 420 and the splice connection 15 are relatively arranged and configured such that the insulating mastic layers 470, 472 and the high permittivity mastic layers 452, 454 collectively form an axially and circumferentially continuous tube surrounding the cables 40, 50 and the connector 60 from the cable semiconductor layer 45 to the cable semiconductor layer 55 (and also overlapping the semiconductor layers 45, 55).

Advantageously, arrangement of the mastic layers 452, 454, 470, 472 can provide higher electrical strength because insulating mastic generally has higher dielectric strength than high permittivity mastic.

The splice body assembly 420, the cover assembly 400, and the pre-expanded unit 401 may be formed by any suitable method and apparatus. According to some embodiments, the mastic layers 452, 454, 470, 472 are pre-mounted on the outer surface 106 of the holdout 102, and the splice body 430 is thereafter installed over the holdout 102 and the mastic layers 452, 454, 470, 472.

According to some embodiments, the primary insulation layer 432 is formed by extruding.

In some embodiments, the cover assembly 400 is formed by a manufacturing process as described above for the cover assembly 100 except that the insulating mastic layer 470, 472 are mounted on the holdout 102 prior to or along with the mastic layers 452, 454.

According to further embodiments, the cover assembly 400 may also include an integral, elastomeric high permittivity layer corresponding to the elastomeric high permittivity layer 234 mounted between the mastic layers 452, 454, 470, 472 and the primary insulation layer 432.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A pre-expanded cover assembly for protecting a cable splice connection including a cable, the cable including an electrical conductor surrounded by a cable insulation layer, the pre-expanded cover assembly comprising:
   a splice body assembly including:
      a tubular, cold-shrinkable, electrically insulative, elastomeric splice body having an interior surface defining an interior passage; and
      a tubular layer of a conformable medium pre-mounted on the interior surface of the splice body, wherein the conformable medium is a flowable material having a high electrical permittivity; and
   a removable holdout, wherein the splice body assembly is mounted on the holdout such that the holdout maintains the splice body in an elastically radially expanded state, and the holdout is selectively removable from the splice body to permit the splice body to elastically radially contract;
   wherein the layer of the conformable medium is positioned and configured such that, when the pre-expanded cover assembly is positioned adjacent the cable splice connection, the holdout is removed from the splice body, and the splice body elastically radially contracts onto the cable splice connection, the layer of the conformable medium will be radially interposed between and engage each of the interior surface of the splice body and an opposing interface surface of the cable insulation.

2. The pre-expanded cover assembly of claim 1 wherein the splice body includes a tubular primary insulation layer formed of extruded silicone or ethylene propylene diene monomer (EPDM) rubber.

3. The pre-expanded cover assembly of claim 2 wherein the splice body further includes a semiconductor layer covering an outer surface of the primary insulation layer.

4. The pre-expanded cover assembly of claim 1 wherein the conformable medium is a mastic.

5. The pre-expanded cover assembly of claim 4 wherein the mastic has a dielectric constant of at least about 10.

6. The pre-expanded cover assembly of claim 5 wherein the mastic has a dielectric constant in the range of from about 15 to 25.

7. The pre-expanded cover assembly of claim 4 wherein:
   the splice body includes a tubular primary insulation layer formed of an electrically insulating elastomer, the primary insulation layer extending from a first axial end to an opposed second axial end;
   the interior passage terminates at the first and second axial ends;
   the tubular layer of mastic extends continuously from the first axial end to the second axial end.

8. The pre-expanded cover assembly of claim 4 wherein the mastic is a silicone rubber-based mastic that has a plasticity number in the range of from about 150 to 650 according to ISO 7323 and is deformable at all temperatures in the range of −20° C. to 50° C.

9. The pre-expanded cover assembly of claim 8 wherein the mastic has a dielectric strength in the range of from about 250 Volts/mil to 700 Volts/mil.

10. The pre-expanded cover assembly of claim 1 wherein the holdout includes a tubular holdout formed by a helically wound strip, and the holdout is configured to be removed from the splice body assembly by pulling the strip.

11. The pre-expanded cover assembly of claim 1 wherein:
   the splice body includes a tubular primary insulation layer formed of an electrically insulating elastomer, the primary insulation layer extending from a first axial end to an opposed second axial end;
   the interior passage terminates at the first and second axial ends;
   the splice body further includes an integral, tubular inner elastomeric layer extending continuously from the first axial end to the second axial end and radially interposed between the primary insulation layer and the conformable medium; and
   the inner elastomeric layer is formed of an elastomer having high permittivity.

12. The pre-expanded cover assembly of claim 1 further including a tubular Faraday cage sleeve mounted on the holdout and radially interposed between the holdout and the conformable medium.

13. The pre-expanded cover assembly of claim 1 further including a conformable, flowable electrically insulating medium pre-mounted on the interior surface of the splice body.

14. A method of manufacturing a pre-expanded cover assembly for protecting a cable splice connection including a cable, the cable including an electrical conductor surrounded by a cable insulation layer, the method comprising:
   mounting a tubular layer of a conformable medium on a removable holdout, wherein the conformable medium is a flowable material having a high electrical permittivity; and thereafter
   mounting a tubular, cold-shrinkable, electrically insulative, elastomeric splice body on the holdout over the conformable medium such that the holdout maintains the splice body in an elastically radially expanded state and an interior surface of the splice body defines an interior passage and engages the conformable medium;

wherein the holdout is selectively removable from the splice body to permit the splice body to elastically radially contract; and wherein the layer of the conformable medium is positioned and configured such that, when the pre-expanded cover assembly is positioned adjacent the cable splice connection, the holdout is removed from the splice body, and the splice body elastically radially contracts onto the cable splice connection, the layer of the conformable medium will be radially interposed between and engage each of the interior surface of the splice body and an opposing interface surface of the cable insulation.

15. The method of claim 14 including forming the splice body, wherein:

the splice body includes a tubular primary insulation layer formed of extruded silicone or ethylene propylene diene monomer (EPDM) rubber; and forming the splice body includes extruding a tube of EPDM rubber and cutting the tube of EPDM rubber to form the primary insulation layer.

16. The method of claim 15 wherein:

the splice body further includes a semiconductor layer covering an outer surface of the primary insulation layer; and forming the splice body includes co-extruding the tube of EPDM rubber and a tube of semiconductive elastomer to form a combined tube, and cutting the combined tube to form the primary insulation layer and the semiconductor layer.

17. The method of claim 15 wherein:

the splice body further includes a semiconductor layer covering an outer surface of the primary insulation layer; and forming the splice body includes applying a semiconductor coating to an outer surface of the tube of EPDM rubber by painting, spraying or dipping to form the semiconductor layer.

18. The method of claim 15 wherein:

the splice body includes a tubular primary insulation layer formed of an electrically insulating elastomer, the primary insulation layer extending from a first axial end to an opposed second axial end;

the interior passage terminates at the first and second axial ends;

the splice body further includes an integral, tubular inner elastomeric layer extending continuously from the first axial end to the second axial end and radially interposed between the primary insulation layer and the conformable medium;

the inner elastomeric layer is formed of an elastomer having high permittivity; an the method includes forming the splice body by co-extruding the primary insulation layer and the inner elastomeric layer.

19. The method of claim 14 further including mounting a tubular Faraday cage sleeve on the holdout radially between the holdout and the conformable medium.

20. A method for protecting a cable splice connection including a cable, the cable including an electrical conductor surrounded by a cable insulation layer, the method comprising:

providing a pre-expanded cover assembly comprising:

a splice body assembly including:

a tubular, cold-shrinkable, electrically insulative, elastomeric splice body having an interior surface defining an interior passage; and a tubular layer of a conformable medium pre-mounted on the interior surface of the splice body, wherein the conformable medium is a flowable material having a high electrical permittivity; and a removable holdout, wherein the splice body assembly is mounted on the holdout such that the holdout maintains the splice body in an elastically radially expanded state, and the holdout is selectively removable from the splice body to permit the splice body to elastically radially contract; and mounting the splice body assembly on the splice connection, including:

positioning the pre-expanded splice body assembly adjacent the cable splice connection; and removing the holdout from the splice body assembly to permit the splice body to elastically radially contract onto the cable splice connection such that the layer of the conformable medium is radially interposed between and engages each of the interior surface of the splice body and an opposing interface surface of the cable insulation layer.

21. The method of claim 20 further including mounting a tubular Faraday cage sleeve on the cable splice connection, wherein when the splice body assembly is mounted on the cable splice connection, the Faraday cage sleeve is radially interposed between the cable splice connection and the conformable medium.

* * * * *

UNITED STATES PATENT AND TRADEMARK OFFICE
CERTIFICATE OF CORRECTION

PATENT NO. : 9,780,549 B2  
APPLICATION NO. : 14/856850  
DATED : October 3, 2017  
INVENTOR(S) : Yaworski et al.

Page 1 of 1

It is certified that error appears in the above-identified patent and that said Letters Patent is hereby corrected as shown below:

In the Specification

Column 15, Line 10: Please correct "The cover assembly 40Q" to read -- The cover assembly 400 --

Signed and Sealed this
Fifth Day of June, 2018

Andrei Iancu
*Director of the United States Patent and Trademark Office*